2,795,485

CRYSTALLIZED ALKALI METASILICATE HYDRATES

Willy Manchot, Hubbelrath, near Dusseldorf, Germany, assignor to Philadelphia Quartz Company, Philadelphia, Pa., a corporation of Pennsylvania No Drawing. Application December 24, 1952,
Serial No. 327,930

Claims priority, application Germany January 5, 1952

10 Claims. (Cl. 23—110)

This invention relates to crystallized alkali metasilicate hydrates; and it comprises the solidification of a melt of an alkali metasilicate hydrate in the presence of a water insoluble precipitated silicate, said alkali metasilicate melt being formed by any known process, said insoluble silicates having been preformed by chemical precipitation. In the preferred process a water insoluble silicate of a divalent metal is used in the amount of from 1 to 5% and in a freshly-precipitated form. The alkali metasilicate melt in this preferred case has a ratio of $Na_2O:SiO_2$ ranging from 0.90 to 1.05. The invention also includes the process in which the insoluble silicate is produced in the melt itself by the addition of suitable amounts of solutions of suitable salts to form a fine precipitate distributed throughout the melt and it also includes the product of the process as described; all as more fully hereinafter set forth and as claimed.

Solid alkali metasilicate hydrates, in particular those with five or nine molecules of water of crystallization per molecule are formed in general by allowing aqueous solutions, having a composition corresponding to that of the solid alkali metasilicate hydrate, to solidify. These aqueous solutions, which are to be regarded as melts of the solid hydrates, can be obtained by dissolution of solid anhydrous alkali metasilicates in the calculated amounts of water or by addition of suitable amounts of caustic soda to technical water-glass solutions. The metasilicate solutions solidify on cooling to a temperature below the melting point of the corresponding hydrate, but yield initially, in this case, glassy solid masses, which crystallize only after long standing, and thereby become capable of being ground. If grinding is undertaken after an insufficiently long period of storage, one obtains greasy masses, which after a short time agglomerate to lumps. The long period of storage has, besides the loss of time, the further disadvantage that the carbon dioxide of the air at the surface of the metasilicate hydrate may react with the latter and form impurities.

An object of the invention is to accelerate the crystallization of the alkaline metasilicate hydrate.

Alkali metasilicates, which serve as starting products for the process according to the invention, can be obtained according to any known processes. Soda and silicic acid may be melted together in the desired ratio, so that an alkali metasilicate is obtained directly. Alternatively an alkali silicate richer in silicic acid, e. g. technical sodium silicate, may first be melted, the melt dissolved in water and the resulting solution adjusted to a ratio of metal oxide to silicon dioxide of 1:1 corresponding to the metasilicate, by addition of alkali. The amount of water is to be adjusted so that it is equal to the water of crystallization of the desired hydrate.

To these solutions is now added a water insoluble precipitated silicate preferably of a divalent metal. The silicates of magnesium and of aluminum have been found to be particularly suitable. Thus my process is operative with insoluble precipitated silicates, selected from the class consisting of the silicates of alkaline earth metals, magnesium and aluminum. In the process one of these insoluble precipitated silicates is added to a solution of an alkali metal metasilicate having a composition corresponding to a hydrate of the alkali metal metasilicate, at a temperature above the melting point of the hydrate, the quantity of insoluble silicate added being from about 1 to 5% by weight. The resulting mixture is then cooled below the melting point of the hydrate to solidify it. The solid is then permitted to stand until crystallization takes place before the product is ground.

These water insoluble silicates can be prepared in a simple manner by precipitation of an alkali silicate solution with solutions of salts of these metals. Besides the water insoluble metasilicates obtainable from alkali metasilicates, silicates with other molecular ratios of metal oxide:$SiO_2$ may also be used. Another process for the preparation of such silicates consists in heating the metal oxide or metal hydroxide with finely divided silicic acid in an aqueous medium. This process is particularly applicable with alkaline earth oxides.

The products thus obtained may be added in the form of pastes, or also (after drying) as a fine powder to the alkali silicate hydrate melts.

The addition of water insoluble precipitated silicates, preferably of divalent metals, to the melts brings about a rapid crystallization of the initially glassy solid mass. For this reason, the products can be ground after a short time of storage, without a fouling of the mill having to be feared. On account of the shorter conditioning or storage period the superficial attack of the carbon dioxide of the air is also smaller. Moreover the surprising observation has been made that the attack of the carbon dioxide of the air is smaller with the ready ground product, than with alkali metasilicate hydrates without the addition according to the invention. Further, the products obtained are distinguished by a specially clear white color.

It is a generally accepted practice to accelerate crystallization of a liquid by the addition of seed crystals. This explanation cannot however be advanced for the manner of action of the water insoluble silicates in the present case since for example with an alkali metasilicate with nine molecules of water of crystallization, an addition of solid crystalline hydrate is far less effective in its action than addition of water insoluble silicates. Therefrom arose the remarkable conclusion that an addition of seed crystals of a foreign type acts better than an addition of seeds of the same type. Moreover, the observed effect cannot be explained as due to a seed formation, because finely distributed colloidal insoluble silicates act better than flaky ones such as can be obtained for example by precipitation in the melt, and these again act better than dry powders, which however are much nearer to the crystalline condition than freshly formed colloidal silicates.

It is further known to add silicates of divalent metals to washing agents containing persalt. However this was effected in order to regulate the oxygen evolution of these washing agents after dissolving the same in water, a process which has nothing to do with crystallization. Finally it is known to dry solid, semi-liquid and some liquid bodies, such as for example, oils, resins, waxes, balsams, and hygroscopic substances, by mixing them with magnesium silicate. This proposal also has nothing to do with that of the present invention, since in the known process liquid or semi-liquid substances such as glycerine or Peru balsam are absorbed by at least the same weight of dry magnesium silicate. In these cases, since the magnesium silicate is used only in small amounts of about 5%, it is a question of dusting the hygroscopic substances superficially with the magnesium silicate to avoid an agglomeration. In contrast thereto the insoluble silicates in the process according to the invention are brought into the melts and enveloped by these melts on solidification and crystallization.

Example 1

57.4 parts by weight of water-glass of 38° Bé. and a molecular ratio of $Na_2O:SiO_2=1:3.3$ are treated with stirring and gentle heating with 23.4 parts by weight of 37% NaOH, 5.6 parts by weight of caustic soda, and 13.6 parts by weight of a 14.5% magnesium silicate paste which has been made by precipitation of a sodium silicate solution with an aqueous solution of an equivalent amount of magnesium sulphate. The magnesium silicate added to the mixture amounted to 1.97% by weight based on the weight of the mixture. After mixing together, the mixture is allowed to stand and cool off. At a temperature of about 36° C., the melt solidifies to a solid mass which after a storage period of 1–2 days can be ground to a fine, dry, loose sodium metasilicate nine hydrate. Without addition of magnesium silicate a storage period of 5–6 days is necessary to obtain a mixture which may be easily ground.

Example 2

69.1 parts by weight of a 54% solution of a sodium silicate with a ratio of $Na_2O:SiO_2$ of 1:2.05 are mixed with 18.5 parts by weight of a 71% soda lye and 12.4 parts by weight of the 14.5% magnesium silicate paste according to Example 1. The magnesium silicate added amounted to 1.8% by weight based on the mixture. After solidification of the mass, a period of 2 days suffices in order to obtain sodium metasilicate five hydrate which may easily be ground to a product which is dry and not sticky.

Example 3

59.0 parts by weight of the alkali silicate used in Example 2, are treated with 35.5 parts by weight of a 28.8% soda lye and 5.5 parts by weight of water. Three parts by weight of a still moist 83% aluminum silicate are stirred into the solution. The aluminum silicate has been prepared by mixing solutions of aluminum sulphate and sodium metasilicate, filtering off the precipitate and rinsing with water. The aluminum silicate added amounted to 2.42% by weight based on the mixture. The solidified sodium metasilicate five hydrate is capable of being ground after keeping for 2½ days and has the same good properties as the products according to Examples 1 and 2.

Other modifications of the process and product herein described which fall within the scope of the following claims will be immediately evident to those skilled in the art. The new products are, of course, useful as detergents and can be substituted for pure sodium metasilicate hydrates in most industrial uses of the latter.

What I claim is:

1. The process of shortening the period required to manufacture ground crystalline alkali metal silicate hydrates which consists essentially in producing an aqueous alkali metal metasilicate solution having a composition corresponding to that of a hydrate of said silicate, heating to an elevated temperature above the melting point of the said hydrate, mixing in from about 1 to 5% by weight, based on the weight of the mixture, of an insoluble silicate, formed by chemical precipitation and selected from a class consisting of the silicates of the alkaline earth metals, magnesium and aluminum, cooling the mixture below the melting point of said hydrate to solidify it, storing the resulting glassy solid to cause crystallization of the hydrate and then grinding; the storage period required being substantially shorter than that which would be required in the absence of said insoluble silicate.

2. The process of claim 1 wherein the insoluble silicate is formed in situ in the alkali metal silicate solution by chemical reaction.

3. The process of claim 1 wherein the insoluble silicate added to the alkali metal silicate solution is magnesium silicate.

4. The process of claim 1 wherein the insoluble silicate added to the alkali metal silicate solution is aluminum silicate.

5. The process of claim 1 wherein the alkali metal silicate solution has the composition of sodium metasilicate pentahydrate.

6. The process of claim 1 wherein the alkali metal silicate solution has the composition of sodium metasilicate nonahydrate.

7. In the crystallization of sodium silicate hydrates, the process which consists essentially in precipitating from an aqueous solution an insoluble silicate, selected from a class consisting of the silicates of the alkaline earth metals, magnesium and aluminum, adding from about 1 to 5% of the freshly-precipitated insoluble silicate while still moist to a solution of a sodium silicate having a composition corresponding to that of a hydrate of said sodium silicate and heated to a temperature above the melting point of said hydrate, cooling the mixture below said melting point, storing the resulting glassy solid to cause crystallization of the hydrate and then grinding; the storage period required being substantially shorter than that which would be required in the absence of said insoluble silicate.

8. As a new composition of matter a heterogeneous mixture consisting of (1) crystallized sodium metasilicate hydrate and (2) 1–5% of a crystallized insoluble silicate selected from the group consisting of the chemically precipitated silicates of the alkaline earth metals, magnesium and aluminum.

9. A composition according to claim 8 wherein the insoluble silicate is magnesium silicate.

10. A composition according to claim 8 wherein the insoluble silicate is aluminum silicate.

References Cited in the file of this patent

UNITED STATES PATENTS

| | | |
|---|---|---|
| 1,419,625 | Guernsey | June 13, 1922 |
| 1,836,093 | Taylor | Dec. 15, 1931 |
| 1,944,848 | Scheidt | Jan. 23, 1934 |
| 2,110,363 | Howells | Mar. 8, 1938 |
| 2,296,689 | Soderberg | Sept. 22, 1942 |
| 2,585,609 | Wills | Feb. 12, 1952 |

FOREIGN PATENTS

| | | |
|---|---|---|
| 683,527 | Great Britain | Dec. 3, 1952 |

OTHER REFERENCES

Vail: "Soluble Silicates," vol. 1, pages 204–219, 226, 229, 232, 327. Copyright 1952. Reinhold Publishing Corp.